Sept. 18, 1928.
G. E. BEAL
1,684,657
SAFETY STEERING MECHANISM FOR AUTOMOBILES
Filed March 24, 1924
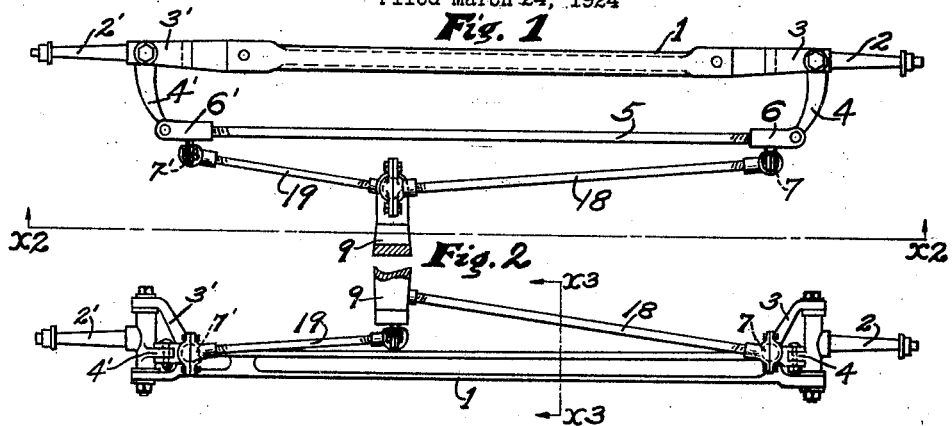
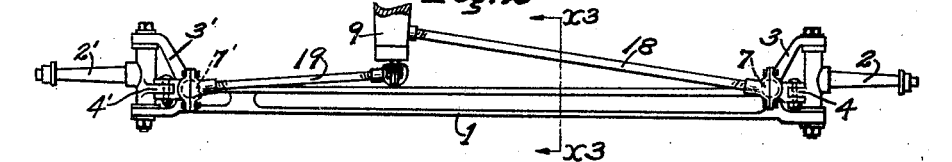
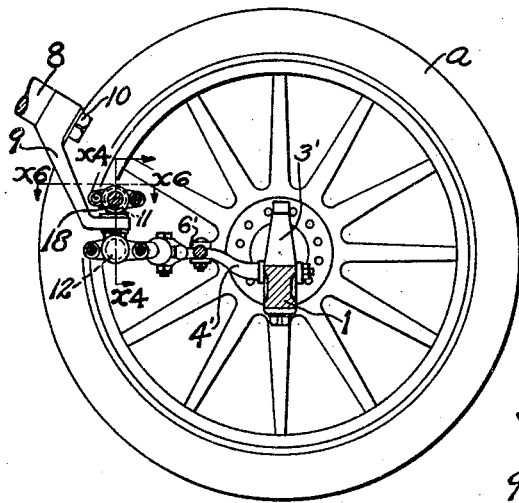
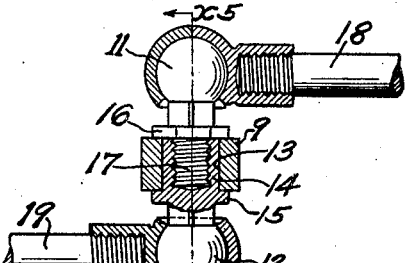
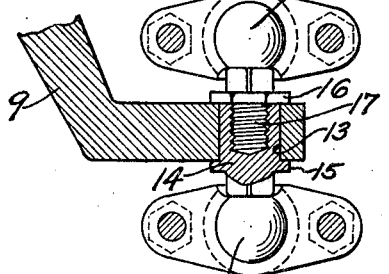
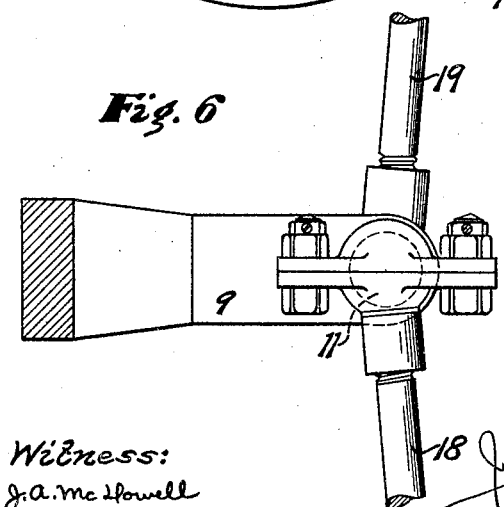
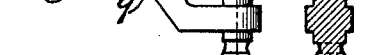
Inventor
George E. Beal
by James R. Townsend
his atty
Witness:
J. A. McHowell Patented Sept. 18, 1928.

1,684,657

UNITED STATES PATENT OFFICE.

GEORGE E. BEAL, OF PASADENA, CALIFORNIA.

SAFETY STEERING MECHANISM FOR AUTOMOBILES.

Application filed March 24, 1924. Serial No. 701,419.

An object of this invention is to provide a novel safety steering mechanism for automobiles whereby likelihood of accident due to broken steering connections is eliminated.

Another object is to provide novel means for steering automobiles to give additional safety in the operation of automobiles.

This invention includes the provision in addition to the usual steering connections, of an auxiliary steering arrangement which during normal operation of the steering apparatus is loosely connected thereto so as to be free from wear and strain, and which will upon breakage of the usual steering mechanism, immediately become effective to steer the automobile.

A further object is to provide a safety steering mechanism which may be readily applied to the vehicles now in use without materially changing the construction thereof.

Other objects, advantages and features of invention may appear from the accompanying drawing, the subjoined detailed description and the appended claims.

The accompanying drawing shows one embodiment of my invention as applied to a Ford automobile.

Figure 1 is a plan view of an automobile front axle wheel support spindles and steering mechanism constructed in accordance with my invention connected thereto; a fragment of the steering gear arm being shown.

Fig. 2 is a view along line $x^2$, Fig. 1, arrows indicate the direction of sight.

Fig. 3 is a section on line $x^3$, Fig. 2, with a wheel mounted on the wheel support spindle.

Fig. 4 is a sectional view on enlarged scale on line $x^4$, Fig. 3.

Fig. 5 is a sectional view on line $x^5$, Fig. 4, on the same scale as Figs. 4 and 6.

Fig. 6 is a fragmental plan view on line $x^6$, Fig. 3, on the same scale as Figs. 4 and 5.

Fig. 7 is a fragmental detail showing a modified form of the forward end of the steering gear arm.

Fig. 8 is a sectional view on line $x^8$, Fig. 7.

The usual automobile front axle 1 having wheel supporting spindles 2, 2' pivotally connected in the forks 3, 3' at each end of said axle, may be of any ordinary construction or design. The wheel supporting spindles 2, 2' are each provided with rearwardly extending spindle arms 4, 4' respectively and are connected together by the drag link 5, which is provided at each end with yokes 6, 6' which straddle the spindle arms 4, 4' and are pivotally connected thereto and each of which yokes has a ball 7, 7' respectively fixed thereto.

The usual steering gear arm 9, may be fixed non-rotatably to the lower end of the steering gear post 8, as shown in Fig. 3, by means of the nut 10 or said arm 9 may be of a sector type common to other makes of automobiles and in both cases is adapted to be operated in the usual manner from the driver's seat. The steering gear arm 9 is provided at one end with upper and lower balls 11, 12, which may be mounted in an orifice 13 in the free end of said arm, as shown in Figs. 4 and 5, or which may be cast integral therewith as shown in Figs. 7 and 8.

The lower swivel ball 12 as shown in Figs. 4 and 5, is provided with an extension or stem 14 which snugly fits the orifice 13 and is provided with a flange 15, which forms a wrench seat and serves as a stop which engages the lower side of the steering gear arm.

The swivel upper ball 11 is provided with a flange 16 which forms a wrench seat and which engages the upper side of the steering gear arm and cooperates with the flange 15 to clamp the end of the steering gear arm 9 therebetween when the threaded post 17 on the upper ball is fully threaded into the extension or stem 14.

The upper swivel ball 11 and socket member 11' are connected by the usual steering gear connecting rod 18 to the ball 7 mounted on the yoke 6. The lower swivel ball 12 and socketed member 12' are connected by an auxiliary connecting rod 19 to the ball 7' on the yoke 6' with a lost motion connection. That is, the connection is only sufficiently loose so that no steering of the wheels $a$ can be accomplished by such connection when the connecting rod 18 is working.

In operation steering of the automobile will be accomplished in the usual manner through the steering gear post 8, arm 9, connecting rod 18 and drag link 5, which is connected to the spindle arms. The auxiliary connecting rod 19 will have only sufficient lost motion in its connections to permit operation of steering the vehicle through the connecting rod 18 and drag link 5 without applying any wear or strain upon the auxiliary connecting rod 19; it being understood that the auxiliary rod 19 will merely follow along through the steering movements.

In case either of the balls 7 and 11 should become crystallized and break or if the connecting rod 18 should break the operator will not lose control of the automobile, as the auxiliary connecting rod 19 will immediately come into operation to enable the driver to guide the automobile and thereby prevent accidents which often occur with automobiles with ordinary steering mechanisms.

The lost motion necessary to accomplish this result will not be sufficient to cause any inconvenience in guiding the vehicle.

I claim:

1. In combination with a steering apparatus for automobiles, a connecting arm; an auxiliary connecting arm, said arms having threaded ends; a steering arm; swivel balls on opposite sides of the free end of said steering arm and in the same vertical medial line; socketed members to engage said swivel balls; a threaded orifice in said socketed members opposite said sockets adapted to receive the threaded ends of said connecting arm and auxiliary connecting arm to form an auxiliary steering apparatus.

2. In a ball and socket connector, a plurality of balls and sockets; a ball; a stem integral with said ball; a threaded recess in said stem; a second ball; a second stem integral with said second ball; threads on said stem; said threaded stem being adapted to engage said threaded recessed stem to form a unitary swivel connector.

3. In a ball and socket connector, a plurality of balls and sockets comprising a ball; a stem integral with said ball; a socketed member adapted to freely engage said ball; a threaded recess in said socketed member; a threaded recess in said stem; a flange integral with said stem; said flange being adapted to form a wrench seat for adjustment of said ball and stem; a second ball; a second stem integral with said ball; peripherally extending threads on said second stem; a flange on said stem to provide a wrench seat for relative adjustment of said second ball and stem; a second socketed member, adapted to freely engage said second ball; a threaded recess in said second socketed member; said second ball and stem being adapted to threaded engagement with said first ball and stem to form a unitary swivel connector.

In testimony whereof, I have hereunto set my hand at Los Angeles, California, this 17th day of March, 1924.

GEORGE E. BEAL.